United States Patent [19]

Kuttner

[11] Patent Number: 5,187,878
[45] Date of Patent: Feb. 23, 1993

[54] ANGULAR DEPTH GAUGE

[76] Inventor: James P. Kuttner, 10138 W. Kenyon Ave., Denver, Colo. 80235

[21] Appl. No.: 919,291

[22] Filed: Jul. 24, 1992

[51] Int. Cl.⁵ .................. G01B 5/18; A01K 91/20
[52] U.S. Cl. ............................. 33/719; 43/25
[58] Field of Search .............. 33/719, 713, 720; 43/4, 43/25, 27.4

[56]  References Cited

U.S. PATENT DOCUMENTS

| | | |
|---|---|---|
| 2,089,031 | 8/1937 | MacDonald. |
| 2,518,907 | 8/1950 | Konwal ................................. 33/719 |
| 2,669,785 | 2/1954 | Rydzewski. |
| 2,752,686 | 7/1956 | Anderson. |
| 3,149,419 | 9/1964 | Koznarski. |
| 3,786,586 | 1/1974 | Swan ................................. 33/563 X |
| 3,874,108 | 4/1975 | Connor ................................. 43/25 |
| 3,957,885 | 6/1976 | Edmiston. |
| 4,586,286 | 5/1986 | Cheatham, Jr. ..................... 43/27.4 |

Primary Examiner—Harry N. Haroian
Attorney, Agent, or Firm—Kyle W. Rost

[57] ABSTRACT

An annular gauge for determining the depth of a fishing lure on a fishing line angularly offset from vertical provides a chart displaying depth indicia. Each indicia accurately corresponds to a predetermined angular offset of the line. The indicia itself is positioned on the annular chart at an angularly offset location corresponding to the angle for which the indicia is accurate. As a result, when the gauge is properly aligned on the fishing rod, the approximately proper depth indicia is displayed at the top of the chart when the fishing rod is rotated by the offset angle.

19 Claims, 2 Drawing Sheets

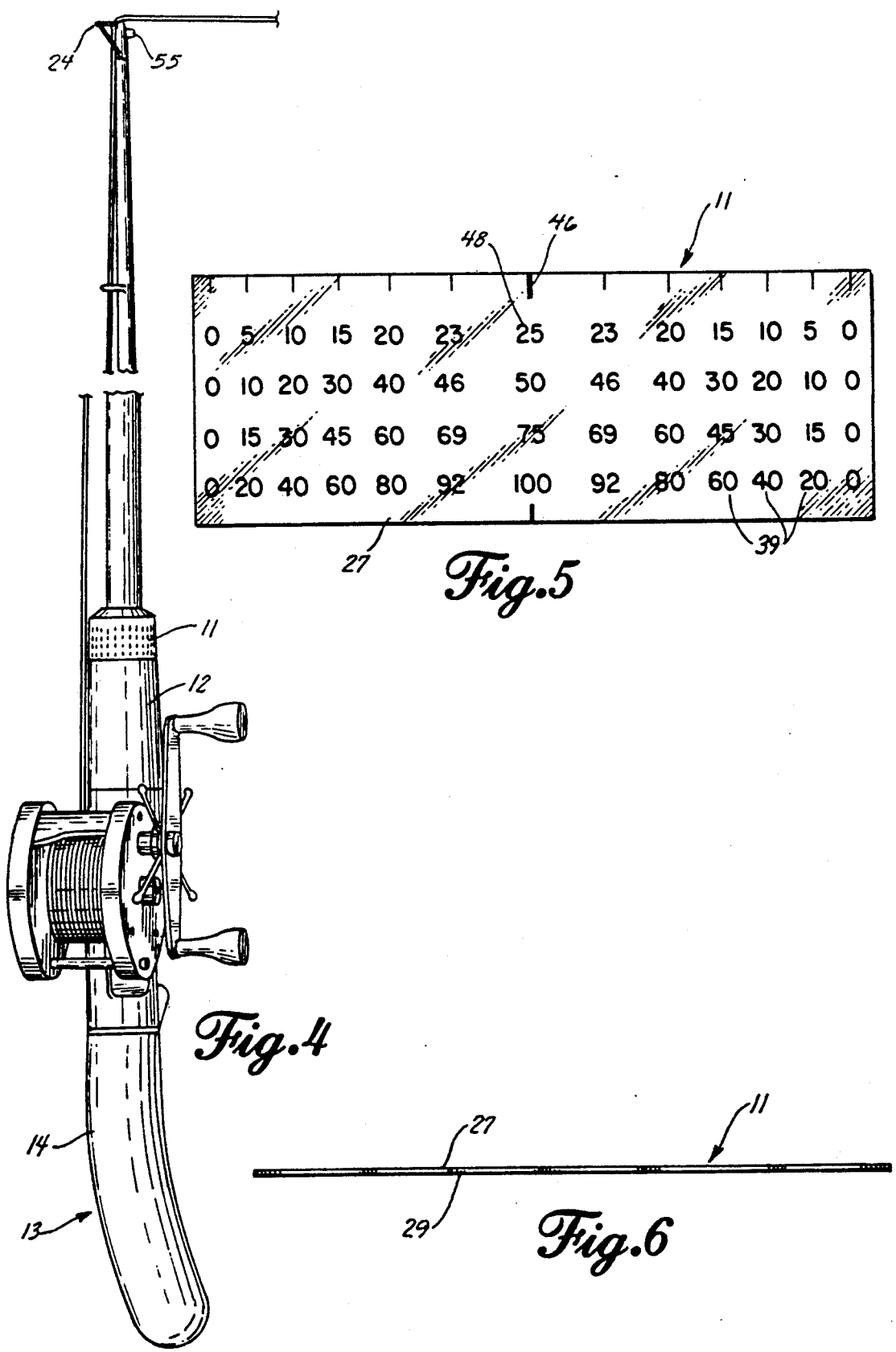

3,149,419 to Koznarski which teaches a trolling aid that employs a graph board having angle markings, a line length scale, a resultant lure depth chart, and a line guide at the origin of the graph board. The board clamps to the boat, while a weighted mechanism keeps the graph board plumb. Another depth determining device is taught in U.S. Pat. No. 2,669,785 to Rydzewski, which discloses a device for tracking the bottom of a lake. The device is clamped to the boat and has scales that measure the angle of an extending line in order to determine depth. A pole-mounted device is taught in U.S. Pat. No. 3,874,108 to Connor. This apparatus includes both a line length measuring meter and an angle gauge. From the combined information of these two, lure depth is determined from a chart. U.S. Pat. No. 3,959,885 to Edmiston discloses an angle gauge that clips onto the end of a fishing pole. From simple angle information, Edmiston points out that a quick trigonometric calculation can produce an idea of the depth, and that a chart could be printed on the device. A line guide is included to assure that the proper angle is indicated. U.S. Pat. No. 4,586,286 to Cheatham, Jr., discloses another device for controlling the depth of a lure during trolling, but from an outrigger and boom. A spirit level allows horizontal leveling, while drag from the line influences an angle measuring device on a rotatable part of the boom. U.S. Pat. No. 2,089,031 to MacDonald shows a metering or measuring gauge for the length of line extended from a reel. U.S. Pat. No. 2,752,686 to Anderson shows a similar gauge on a reel and, in addition, discloses the use of this information for adjusting trolling depth.

ANGULAR DEPTH GAUGE

TECHNICAL FIELD

The invention generally relates to geometrical instruments such as line engaging instruments, distance measuring instruments in which an article support is integral with the measuring means, and sounding type distance measuring instruments employing a line with a weight. The invention also generally relates to fishing instruments such as instruments that attach to a fishing rod, fixed support line handling means such as trawls, and special line attachments. Disclosed is a fishing aid for determining the depth at which a lure is running.

BACKGROUND ART

In the prior art, a number of devices have employed gauges or charts in order to assist the fisherman in determining the depth of his line. For example, U.S. Pat. No.

The desirability of having available a depth determining gauge is clear from the variety of instruments proposed in the prior art for this purpose. However, it appears that no one instrument has been entirely satisfactory. One possible problem in the prior art is complexity and resultant difficulty in use. Devices that clamp onto a boat can be awkward to install and use. Gauges that are built into a reel can be expensive and lack flexibility when a different reel or pole is to be used. Consequently, it would be desirable to have available a depth gauge that is small in size, highly portable, easily installed, and simple to use. In addition, it would be highly desirable for such an instrument to be adaptable to almost any type of fishing equipment. Further benefits would arise from low cost and durable construction, having no moving parts.

To achieve the foregoing and other objects and in accordance with the purpose of the present invention, as embodied and broadly described herein, the fishing depth gauge and method of use of this invention may comprise the following.

DISCLOSURE OF INVENTION

Against the described background, it is therefore a general object of the invention to provide an improved fishing aid for determining the depth at which lure is travelling, such as during trolling.

A more specific object is to provide a gauge of extremely simple construction, such that it has no moving parts.

Another object is to provide a gauge that fits substantially any fishing pole, or, in the alternative, is quickly, simply, and inexpensively adapted to fit any pole.

Still another object is to provide a gauge that is portable and able to fit into a pocket or tackle box. In addition, the gauge can be transferred from one fishing rod to another in seconds and without requiring substantial recalibration.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, an angular depth gauge for determining the depth of a lure, when the fishing line is angularly offset from vertical, is adapted for use in combination with a rod having the line extending from it. The gauge includes a depth chart displaying a plurality of indicia of line depths corresponding to combinations of at least a predetermined line length and a plurality of predetermined angular offsets at which a line might be disposed. The chart carries each indicia in an angularly offset position on the chart such that the approximately proper depth indicia is indicated when the chart is rotated to the associated predetermined angle. In addition, a mounting device allows the gauge to be carried on an elongated rod such that said gauge is positionable about the longitudinal axis of the rod and rotatable with the rod.

The accompanying drawings, which are incorporated in and form a part of the specification illustrate preferred embodiments of the present invention, and together with the description, serve to explain the principles of the invention. In the drawings:

BRIEF DESCRIPTION OF THE DRAWINGS

FIG. 4 is a top plan view of a fishing rod, showing an alternative embodiment of the gauge in use, with a depth reading.

FIG. 5 is a developmental view of an alternative embodiment of the depth gauge, showing a depth chart arranged by depth increments.

FIG. 6 is a side elevational view of the depth gauge of FIG. 5.

BEST MODE FOR CARRYING OUT THE INVENTION

Figure 1:
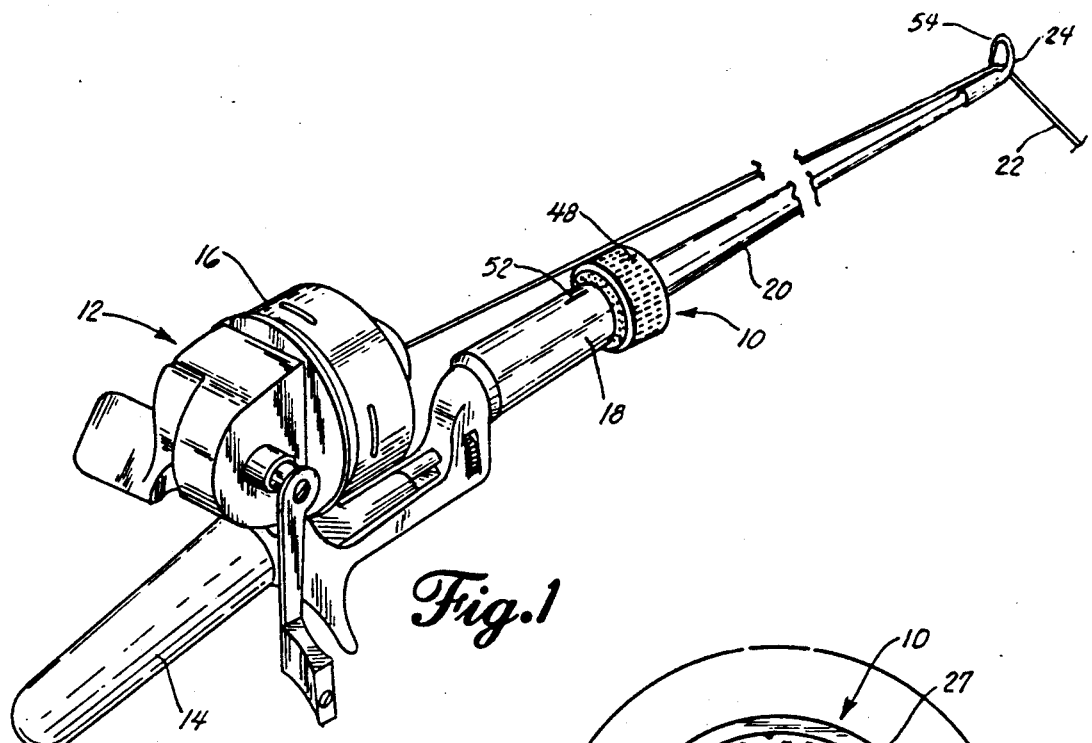
FIG. 1 is an isometric view of a fishing rod having the depth gauge installed.

The invention is a gauge for determining the depth of a lure at the end of a line that is carried from a rod or pole and is angled from vertical. Such an invention has application to fishing and may have additional uses, as well. With reference to FIG. 1 of the drawings, the invention is an angular depth gauge 10, shown in use on a fishing rod assembly 12, shown here as a spinning rod, typically having a handle portion 14 at a proximal end; a reel 16 and ferrule 18 juxtaposed to the handle portion; and rod portion 20, with fishing line 22 extending from the reel through end eye 24 at a distal end of the rod. The gauge is applied or incorporated into the rod assembly and carried on or near the handle portion 14, such as at the ferrule 18, near the proximal end of the rod. In this embodiment, the gauge is movably attached with respect to the rod assembly, so that it can be adjusted on the longitudinal axis of the rod. In addition, the gauge is removable, such as by a separation or slot in its structure, which enables the gauge to be removed from one rod and installed upon another in a brief time.

An alternative construction of the invention is shown in FIGS. 4–6, in which a modified gauge 11 is carried on a bait casting rod 13, for example on the distal end of the ferrule 18. While this embodiment shows an alternative rod style, it also shows an alternative gauge style that is attached to the rod in a substantially permanent manner. The gauge 11 may constitute a chart that is engraved on the ferrule or other desired portion of the rod 13, such as during original manufacture or subsequently. Alternatively, as shown in FIGS. 5 and 6, the gauge 11 may be formed of sheet material that can be adhered to the rod in any desired position. Such sheet material can be tape, a metal or plastic plate, or other material that is formed into the desired arcuate shape. An adhesive backing 29 can affix the gauge 11 to the rod. Either type of gauge, 10 or 11, is used with either type of rod or with still other rod designs.

Figure 2:
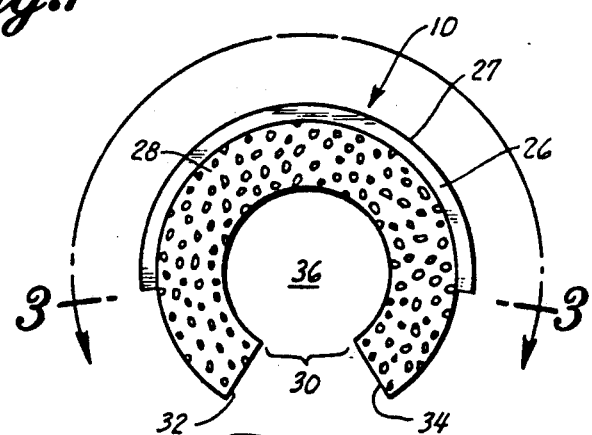
FIG. 2 is an end view of the depth gauge.

The construction of the gauge 10 is best shown in FIG. 2, wherein a face member 26 and a depth chart 27 are associated with a mounting means or backing member 28. The face member comprises depth chart 27 arranged in a generally annular, arcuate, or cylindrical disposition, or any other disposition that would enable entries on the chart to be physically arranged over a somewhat arcuate surface or space. This chart has a center point 48 representing or corresponding to a neutral or non-angling disposition of fishing line. From this center point, the chart extends to one or both sides in an arc corresponding to the range of the possible angles at which fishing line could diverge from vertical, or about 90° on each side of the neutral center point. The face member is constructed of a rigid type of material such as a stiff plastic so that it maintains its cylindrical shape and hence the accuracy of the gauge, regardless of the diameter of the handle on various types of fishing rods. The face member is preferred to be constructed of a water resistant or water proof material such as metal, plastic or glass. The indicia may be cast or stamped onto the face member, although it may have a transparent face and an opaque backing on which the various depth indicia are displayed.

With reference to the embodiments shown in FIGS. 4–6, the chart 27 can be printed on a waterproof tape and applied to the surface of the face member 26. Alternatively, if printed on waterproof tape or other sheet material, the tape bearing the chart could be adhered directly to the handle portion 14 at the ferrule 18. Alternatively, the chart could be printed or engraved directly on the handle or ferrule, either at the time the rod is manufactured, or by other means at a later time.

The backing member 28 of gauge 10 is a flexible, resilient, partial ring, partial cylinder or other similar shape. It may be constructed of a foam plastic, elastomer, sponge rubber, or like flexible, resilient material. The backing generally is preferred to be C-shaped as viewed along the axis of a cylinder, as shown in FIG. 2. An open arc 30 is formed between ends 32, 34. This open arc is sized to receive the rod portion of a fishing rod assembly and may be about 60° to 80° in size. The typical width of the open arc is about one-half inch, which is suitable to allow reception of most rods. The typical thickness of the backing, measured on the radius of a cylinder, is about one-fourth inch. A central, axial bore 36 is formed by the backing, and this bore receives the handle portion 14 at the ferrule 18. Because the backing is a foam or sponge material, it serves three purposes. First, the size of the bore need be only approximately similar to the size of the handle. A bore diameter of three-fourths inch to one and one-fourth inches is suitable for most uses, allowing the gauge to be used on various sizes of rods. Second, the flexible backing member maintains the surface of face member 26 equidistant from the central, longitudinal axis of the rod portion 20. This keeps the gauge centered with respect to the axis of the rod and maintains the accuracy of the gauge scale when the rod and gauge are rotated. Third, the flexible, resilient material firmly holds the gauge on the rod handle.

The depth chart on face member 26 contains indicia of lure depth. Each indicia can be determined or estimated to be an approximate lure depth based upon fishing line of preselected length, offset from vertical at a preselected angle from a fishing pole. Thus, each indicia may be derived by trignometry based upon knowledge of the associated line length and angular offset, and these factual underlying line lengths and angular offsets from vertical will be referred to as the "associated" figures for each indicia. The scale indicia derived for a given face member diameter is accurate only for that size diameter. The scale indicia must be re-calculated if a face member of a different diameter is used, or if the depth chart is affixed directly to the handle of a fishing rod with a different diameter handle. The preselected line length can be any one or more selected line lengths. The best choices are selected from the common line lengths that are used in fishing. For example, the line length could be 25, 50, 75 or 100 feet. The preselected angular offset can be any angle at which a line could depend from a pole. The typical range of choices is from zero, for a vertical line, to ninety degrees, for a horizontal line. For example, the angular offsets could be every five or ten degrees from zero to ninety degrees. Angles other than zero, or vertical, would occur when the line and water are moving with respect to each other. For example, a stationary fisherman in a moving river would have an angularly offset line, as would a fisherman trolling in a boat. Any combination of causes of relative motion between the fishing line and the water could result in the fishing line being angularly offset from vertical, as measured in a transverse plane at the end of the rod.

Figure 3:
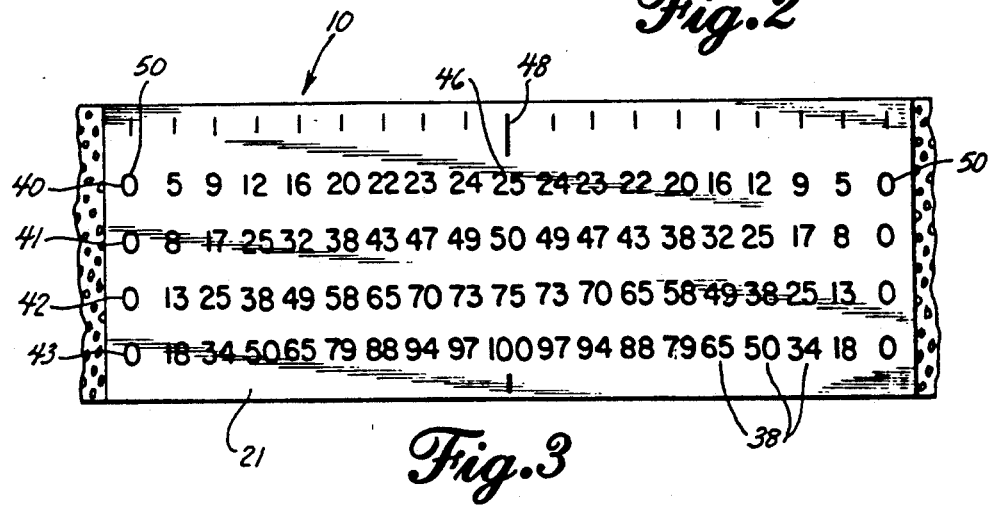
FIG. 3 is a top, developmental view of the depth gauge taken along the plane of line 3—3 of FIG. 2, showing a depth chart arranged by angular increments.

These indicia are spatially arranged on the depth chart of FIG. 3 so that each depth indicia 38 is in the appropriate physical, angularly offset location corresponding to the associated predetermined angle of a fishing line for which the indicia was determined. These angularly offset locations are determined relative to the central, zero point. Thus, the indicia for a line angularly offset by ten degrees is located ten degrees to one or both sides of the zero point.

The indicia 38 of FIG. 3 also is arranged or displayed to indicate the associated line length for which the depth is determined. For example, each of several line lengths can be displayed on the chart by using a separate row of indicia for each length, or each length could be represented by a different color of indicia. The chart can be created to correspond to any desired lengths of fishing line. In FIG. 3, the chart is arranged in four sub-charts, 40, 41, 42, and 43. Each of the sub-charts applies, respectively, to a different one of four associated fishing line lengths: 25, 50, 75, and 100 feet of extended fishing line.

According to the method of creation, each sub-chart of FIG. 3 carries the depth information in such a way that the central indicia FIG. 46 corresponds to the approximate length of line extended from the rod. This central figure may mark the center point of the chart, or an index mark 48 may serve this purpose. In positional terms, this central figure can be viewed as being an index mark at zero degrees or vertical top center of the chart when in its angularly aligned position. In function, this central figure in the index location is indicative that the indicated length of fishing line is vertical, at zero angle, or is at a depth corresponding to the full length of the fishing line.

At each side of the central indicia 46 in FIG. 3 are additional indicia. Each of these indicia represents the depth of the lure when the line is at an angular offset corresponding to the angularly offset position of the indicia on the chart. For example, starting from top center as representing zero degrees or vertical, another indicia may be recorded every ten degrees about the annular surface of the gauge. Thus, a fishing line deviating ten degrees from true vertical will carry its lure at slightly less depth in the water than when at true zero, and so on. Finally, the ninth FIG. 50 from center would be disposed at horizontal, or ninety degrees from the central figure. This indicia would be, of course, a "0," since a horizontal line would have substantially no depth in the water, relative to the end of the rod.

This structure and function can be seen in the specific examples of FIG. 3. The top sub-chart 40 is applicable to a twenty-five foot line, and, thus, the center figure of this chart is "25." At twenty degrees angular offset, a twenty-five foot line would have a depth of about "23" feet. At thirty degrees deflection, the depth would be only about "22" feet. At eighty degrees deflection, the depth is only about "5" feet. The depth indicia are rounded to the nearest integer for ease of reading the scale. These figures are derived from trigonometric calculations of depth according to known line length and known angular offset of the line from vertical. If desired, the results can be adjusted for even better accuracy by deducting the typical height of the fishing pole above the surface of the water, such as by subtracting a few feet from each depth figure. The result is a very good approximation of the depth at which the lure or other bait is located in the water.

Alternatively, the scale indicia can be spatially arranged on the depth chart, as shown in FIG. 5. Each depth indicia 39 is at an equally spaced depth increment. For example, in the sub-chart corresponding to 25 feet line length, depth indicia are in increments of 5 feet. At the 50 foot length, the increments are at 10 feet each. Each depth indicia is located at a spatial position on the arc of the gauge corresponding to its associated angle. Thus, in contrast to the indicia spacings of FIG. 3, in FIG. 5 the depths are spaced in each sub-chart in an uneven pattern. For example, in the twenty-five foot chart of FIG. 5, the regular depth figure, "20," is relatively farther from the center indicia than it is from the second sequential figure, "15." Note that an irregular intermediate indicia, "23," has been inserted in the larger space on the chart.

The general operation of the invention requires that the gauge be installed on a longitudinally elongated fishing rod assembly. Typically, a fishing rod is held in a neutral or central position, wherein the reel and line eyes are on either the top or bottom of the rod portion, rather than to either side. For purposes of more detailed explanation, the rod is best viewed as shown in FIG. 1, with the reel 16 and line eye 24 laterally offset from the longitudinal axis of the rod and mutually aligned in an index plane, or vertical plane, through that longitudinal axis of the rod and passing through the center of the end line eye 24. This position of the rod will be referred to as being "index position," which corresponds to the normal, non-tilted way of holding a rod.

The gauge is installed on the rod by slipping the gauge, at the opening of the arc, around the longitudinal axis of the rod, and pressing it back on the handle, around the ferrule, about the longitudinal axis of the rod until the center numbers 48—the line lengths—also are in this same index plane, at the top center of the rod. For spinning type rod and reel combinations similar to FIG. 1, the center numbers are positioned on the top center of the rod, while the reel and eye 24 are on the bottom center of the rod. For bait casting or spin casting rods and reels similar to FIG. 4, both the reel and eye 24 are on the top center of the rod. The gauge is provided with an alignment mark such as center index mark 48 indicating approximately zero degrees angular offset. The surface of the rod, the ferrule, or any other structure adjacent to the gauge is marked with a corresponding index mark such as line 52, also in the index plane. This corresponding index mark is aligned with the center numbers of the gauge or with index mark 48 to quickly and easily align the gauge on the rod. The eye 24 at the free end of the rod is marked with an index mark or dot 54, or tab 55, FIG. 4, at its bottom point, the point of the eye that the fishing line touches when it hangs straight down, also within the index plane. A short tab 55 affixed to the rod at the tip can serve as a more visible index mark, especially with bait casting or spin casting type rods. With the rod so marked, the gauge is ready for use. In the embodiment of FIGS. 4-6, the tape, engraving, or other relatively permanent placement of the chart on the rod is done using the same concepts of alignment. Of course, the marks 48 and 52 may be omitted if the manufacturer or installer otherwise is able to locate the chart in the proper position.

When the fishing line is in relatively moving water, such as during trolling or the like, the fishing line will be angularly offset from vertical as it depends into the water from the rod end. In order to use the gauge properly, the rod is positioned directionally so that rod is normal to the vertical plane containing the extending line. Typically, from a moving boat the rod is extended transversely, at a right angle from the side of the boat, since the line typically will extend approximately straight back from the direction of boat travel. With the rod so positioned, the fishing line will pass through the eye 24 at the free end of the rod portion while contacting the annular wall of eye 24 at a point approximately corresponding to the angular offset of the line from vertical. Thus, for example, if the line angles rearwardly at twenty degrees from vertical, when the rod is held in the index position described above, the line will contact the wall of eye 24 about twenty degrees from the bottom point of the eye. Dot 54 is located at the bottom point of the eye, and tab 55 is located at the bottom point of the rod, when the rod is held in index position. Dot 54 and tab 55 eventually will be used as visual aids for rotating the rod by the same number of degrees as the angle by which the line is offset from vertical.

In this example, the gauge is used by angularly rotating the rod about its longitudinal axis until the fishing line aligns with or overlaps the dot 54 on the end eye 24, or with tab 55 on the rod. Then, the gauge is read by examination of the top indicia in the appropriate sub-chart. Thus, this top indicia is selected or displayed by virtue of the rod's angular twist or offset about the longitudinal axis of the rod. The fisherman may estimate the length of line that is extended in order to select the appropriate chart. FIG. 4 illustrates the rod rotated to the angle of the line extending from the rod and shows a depth of 20 feet for a line length of 25 feet.

Since the operation of this invention requires that certain line lengths and angles be preselected, the gauge is accurate primarily when those exact lengths of line and angular offsets are in use. However, the use of multiple sub-charts is helpful in assisting the fisherman to estimate depth when an intermediate line length is extended. For example, sub-charts 40 and 41 of FIG. 3 show that at sixty degrees, twenty-five feet of line would reach twelve foot depth, while fifty feet of line would reach twenty-five foot depth. It is relatively easy to interpolate from the two sub-charts in order to estimate a depth of line between twenty-five and fifty feet in length. Similarly, it is possible to interpolate between the predetermined angles of the chart if the fishing line lies at some intermediate angle.

As previously explained, the embodiment of FIG. 5 employs equal depth increments between the reported depth indicia. Equal depth increments allow for a quicker interpolation of the numbers if the fishing line happens to be between any of the indicia points marked.

The description of the preferred embodiment discloses a version of the invention and method of use that is extremely economical and easy to use. Another embodiment could provide that the chart is to be rotated after the rod is tilted, so as to line up the depth figure with index mark 52 or with another pointer. Still another variation could employ a separately rotatable index ring to be twisted to point to the top indicia, or such separate ring could be gravity leveled to automatically point to the exact top indicia. A spirit level or electronic means also could be used. These variations are considered useful, although the complexity and cost they would contribute to the invention show that they would likely add expense to the gauge. However, the principle of the depth gauge would remain the same and be included under this current design.

Since any line lengths and any angles could be used, it should be appreciated that the selection of predetermined angles and line lengths is arbitrary. Similarly, the positioning of the gauge on the rod is arbitrary, as the gauge will function whether on the rod portion, handle portion, or other location, so long as the gauge is positioned approximately about the longitudinal axis of the rod assembly. The face of the gauge can be the surface of a cylinder or portion of a cylinder, a ring or portion of a ring, an arcuate segment extending either radially or circumferentially to the axis of the rod assembly, or another shape that, nevertheless, allows each depth indicia to be located in a position where the appropriate indicia will be indicated when the rod is rotated by the angle associated with the depth indicia. Also, the scale could be printed directly on any portion of the rod handle, or the scale could be printed on a piece of tape that can be applied directly to the handle.

Likewise, the thickness of the backing material can be selected to fit any desired rod or portion of a rod, and such material can be removed and replaced or supplemented with additional or different backing material to adapt the gauge to any desired diameter of rod or rod portion. Different collars could be placed over rod to provide a fit without requiring use of the backing material. Finally, although the preferred backing material is a partial ring for ease of installation and removal, the ring could be substantially closed; closed by buckles, straps or tape; attached by set screws or hook and loop fasteners; or modified to be in a shape other than annular or cylindrical. Still further, although this invention has been described as applied to the fishing arts, it may have utility in still other areas where the depth of an object on an angled line is to be approximately determined.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. A angular depth gauge for determining the depth of a lure on an attached fishing line when such line is angularly offset from vertical, adapted for use in combination with a rod having the line extending therefrom, comprising:

a depth chart displaying a plurality of indicia of line depths corresponding to combinations of at least a preselected line length and a plurality of preselected angular offsets at which a line might be disposed, the chart carrying each indicia in an angularly offset position on the chart such that the approximately proper depth indicia is indicated when the chart is rotated to said predetermined angle; and a mounting means for associating said depth chart with an elongated rod such that said chart is positionable about the longitudinal axis of the rod and rotatable with the rod.

2. The depth gauge of claim 1, wherein: said depth chart comprises a plurality of sub-charts, wherein each of two or more sub-charts, respectively, provides said indicia associated with a different length of extended line.

3. The depth gauge of claim 1, further comprising: an index mark on said depth chart corresponding to a predetermined angular offset of approximately zero degrees.

4. The depth gauge of claim 1, wherein said depth chart comprises an approximately cylindrical chart surface and said indicia are located at circumferentially spaced locations about said cylindrical surface.

5. The depth gauge of claim 1, wherein said mounting means comprises a flexible, resilient backing on said depth chart for, in use, frictionally gripping a rod and carrying said depth chart in a position about the longitudinal axis of the rod.

6. The depth gauge claim 1, wherein said mounting means comprises an adhesive backing on said depth chart for, in use, bonding the chart to a fishing rod in a position about the longitudinal axis of the rod.

7. An angular depth gauge in combination with a longitudinally elongated fishing rod having proximal and distal ends, for, in use, determining the depth of a lure attached to a fishing line generally following the longitudinal axis of the rod from the proximal end through a line eye located near the distal end of the rod and disposed at an angle offset from vertical, said gauge comprising:
 a plurality of indicia of predetermined lure depths, each corresponding to and associated with the combination of a preselected line length and a preselected angular offset of the line from vertical; and
 wherein each indicia is positioned about the rod at a location angularly offset from a central position such that, in use, the indicia is displayed in response to the rod's being rotated about its longitudinal axis from central position by approximately the number of degrees of said preselected angular offset associated with the indicia.

8. The combination of claim 7, further comprising: a depth chart displaying a plurality of said indicia of lure depths, the chart carrying each indicia in an angularly offset position such that the chart is positionable to indicate approximately the proper depth indicia when the chart is rotated by said predetermined angular offset associated with the proper indicia.

9. The combination of claim 8, wherein said depth chart comprises a plurality of sub-charts, and each of two or more sub-charts, respectively, provides said indicia corresponding to a different length of line extending from the distal end of said rod.

10. The combination of claim 8, further comprising: an aligning means for accurately positioning said depth chart on said rod.

11. The combination of claim 10, wherein said aligning means comprises an index mark on said depth chart corresponding to a predetermined angular offset of the line of approximately zero degrees.

12. The combination of claim 10, wherein said aligning means comprises an index mark on said rod indicating a rotational position of said depth chart in which the depth indicia are approximately accurately located.

13. The combination of claim 7, wherein an index plane contains the longitudinal axis of the rod and passes centrally through said end line eye, further comprising:
 an index mark disposed approximately in said index plane, located near the distal end of the rod.

14. The combination of claim 13, wherein said index mark is located on an edge of the end line eye.

15. The combination of claim 13, wherein said index mark comprises a tab.

16. The combination of claim 8, wherein said depth chart comprises an approximately cylindrical chart surface and said indicia are located at circumferentially spaced locations about said cylindrical surface.

17. The combination of claim 7, further comprising: a flexible, resilient backing on said depth chart for, in use, frictionally gripping said rod and carrying said depth chart about the longitudinal axis of the rod.

18. The method of determining the depth of a lure attached to a fishing line and extending from the end of an elongated rod when such line is angularly offset from vertical, the rod having the line extending therefrom through an end line eye that is located near a longitudinal end of the rod and is offset from the longitudinal axis of the rod, comprising:
 providing a depth chart having a generally arcuate surface displaying a plurality of indicia of lure depth corresponding to a plurality of combinations of a predetermined line length and a plurality of predetermined angular offsets from vertical of the line, wherein each indicia is positioned on said arcuate surface at approximately the angular offset from zero degrees corresponding to the predetermined angular offset from vertical of the line associated with that indicia;
 determining a zero degree index position at a circumferential location on the rod and in an index plane that contains the longitudinal axis of the rod and passes approximately centrally through said end line eye;
 locating said depth chart on the elongated rod such that:
  said arcuate surface is disposed approximately on a radius to the longitudinal axis of the rod; and
  each indicia is offset from the zero degree index position by the angle associated with said indicia;
 directionally positioning the rod to have its longitudinal axis approximately normal to a vertical plane passing through the line extending beyond the end line eye;
 angularly positioning the rod by rotating the rod about its longitudinal axis until the line extending beyond the end line eye approximately is contained in the index plane; and
 reading the depth chart indicia at the top of said depth chart.

19. The method of claim 18, wherein said step of locating the depth chart on the rod further comprises:
 aligning the depth chart by rotating it around the longitudinal axis of the rod relative to said zero degree index position until each indicia is offset from the zero degree index position by the angle associated with said indicia.

* * * * *